United States Patent [19]

New et al.

[11] Patent Number: 5,205,893
[45] Date of Patent: Apr. 27, 1993

[54] METHOD AND APPARATUS FOR ATTACHING LAGGING MATERIAL TO A ROLLER

[75] Inventors: Richard W. New; Amos J. Lewman, both of St. Louis, Mo.

[73] Assignee: Beltservice Corporation, St. Louis, Mo.

[21] Appl. No.: 809,788

[22] Filed: Dec. 18, 1991

Related U.S. Application Data

[63] Continuation of Ser. No. 370,813, Jun. 23, 1989, abandoned.

[51] Int. Cl.[5] .............................................. B32B 31/04
[52] U.S. Cl. ..................................... 156/215; 29/235; 156/287; 156/294; 156/475; 156/382
[58] Field of Search ............... 156/216, 400, 401, 287, 156/294, 227, 215, 475, 382; 29/235

[56] References Cited

U.S. PATENT DOCUMENTS

| 3,010,194 | 11/1961 | Fratzke | 29/235 |
| 3,813,313 | 5/1974 | Feucht et al. | 156/156 |
| 4,278,484 | 7/1981 | McGaughey | 156/401 X |
| 4,391,661 | 7/1983 | Izraeli | 156/287 X |
| 4,427,473 | 1/1984 | Shichman et al. | 156/401 X |
| 4,441,956 | 4/1984 | Kiss | 156/216 X |

FOREIGN PATENT DOCUMENTS 52-12281  1/1977  Japan ................................. 156/216

*Primary Examiner*—Michael W. Ball
*Assistant Examiner*—Michele K. Yoder
*Attorney, Agent, or Firm*—Polster, Polster and Lucchesi

[57] ABSTRACT

A method and apparatus for attaching a cover (C) to a roller (R) or other device to be covered. A tube (15), cylindrical section, or other shape of cover material is inserted in a fixture (3) and each end of the tube is sealed to the fixture. A wall (21) of the fixture and a wall (23) of the tube form a chamber (19) which is evacuated so the tube expands against the wall of the fixture. A roller or other device to be covered is inserted into the fixture. The vacuum is then removed. The tube wall falls away from the side of the fixture and collapses around the outer surface of the roller.

6 Claims, 3 Drawing Sheets

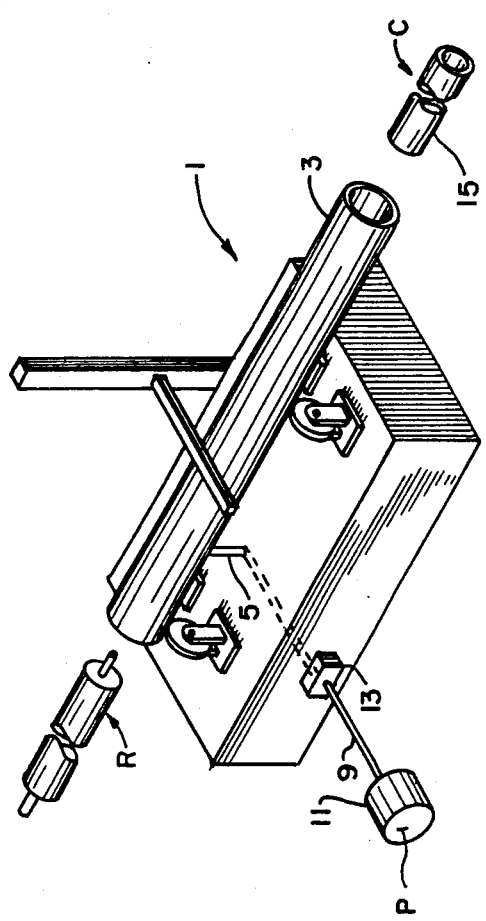
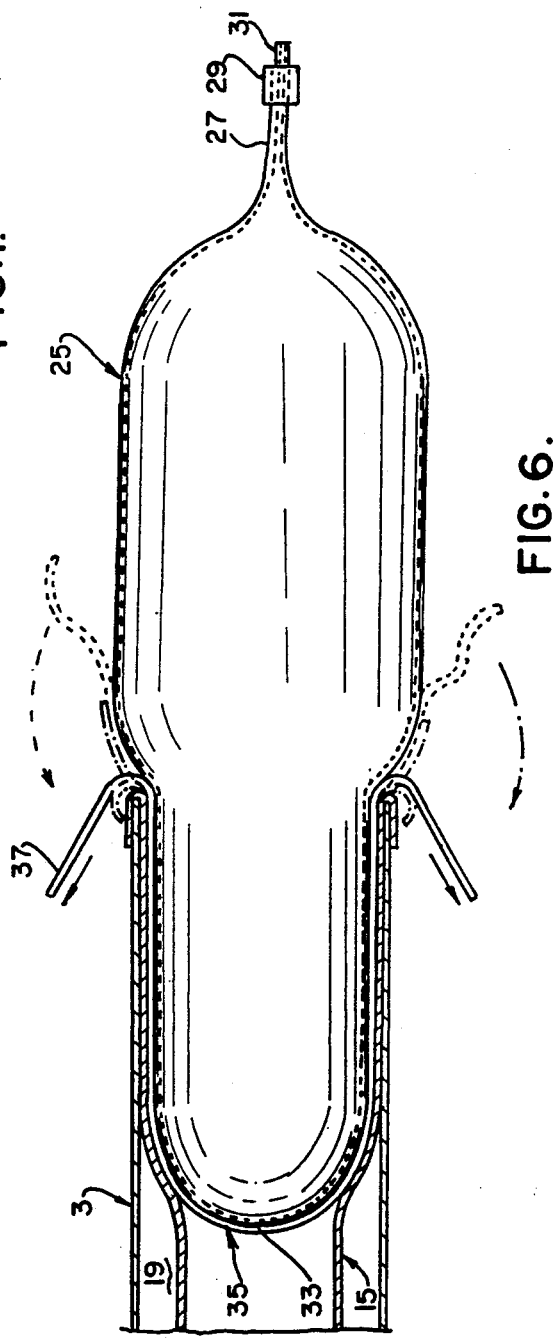

METHOD AND APPARATUS FOR ATTACHING LAGGING MATERIAL TO A ROLLER

This is a continuation application of Ser. No. 07/370,813, filed Jun. 23, 1989, now abandoned.

BACKGROUND OF THE INVENTION

This invention relates to the application of a coating material to a surface and, more particularly, to a method and apparatus for mounting a cover material to a roller. While the invention is described in particular detail with respect to such applications, those skilled in the art will recognize the wider applicability of the invention disclosed hereinafter.

It has been found that covering metal rollers, for example, pulleys or idlers used in conveyor systems, or casters, with a high friction, wear resistant urethane, vinyl or similar elastometric material provides smoother operation than just using the plain, metal roller. One problem in producing such rollers, however, is finding a simple, inexpensive way of covering the roller, particularly on a production line basis. In addition, conveyer rollers often are remanufactured. In the past, it has been difficult to apply a new lagging cover to a roller particularly when its roller is remanufactured. As may be appreciated, the lagging material often wears in applicational use. Replacement of the lagging extends the life of the original conveyer system, for example.

A number of attempts have been made in the art to attach lagging to rollers, particularly those employed in industrial conveyer systems. While these prior art methods and apparatus work well for their intended purposes, they generally are characterized by complicated construction and/or operational methods which are complicated and undesirable in applicational use.

We have discovered that roller lagging, of various forms and construction, can be adhered to rollers of various diameters and lengths easily, simply and economically.

SUMMARY OF THE INVENTION

Among the several objects of the present invention may be noted the provision of a method and apparatus for applying a cover material to a roller such as a conveyer roller or idler; the provision of such apparatus to utilize a tube of material to cover the roller; the provision of such apparatus to utilize a fixture for clamping the material in place and then inserting the roller to be covered into the fixture, enabling the material to be fitted over the roller; the provision of such method to create a chamber between a side wall of the fixture and the material; the provision of such method to create a vacuum by which the created chamber is evacuated prior to insertion of a roller into the fixture; the provision of such method to release the vacuum after the roller is inserted to allow the cover material to collapse around the outer surface of the roller and thereby cover it; and, the provision of such method and apparatus to provide an inexpensive, manually or automatically controlled way of covering rollers on a volume basis.

Briefly, as a method, the invention for attaching a cover to a roller comprises inserting a tube of elastic, cover or lagging material into a hollow, cylindric fixture. One or both ends of the tube is secured to the fixture to form a chamber between a side wall of the fixture and the adjacent wall of the lagging tube. The chamber is evacuated to draw the lagging against the side wall of the fixture. After inserting a roller into the fixture, the vacuum is released so the lagging material falls away from the side wall and collapses around the roller.

As apparatus, the invention includes a hollow, cylindric fixture into which a roller is insertable. A tubular portion of lagging cover material is inserted into the fixture prior to insertion of the roller. Means are provided for expanding the side of lagging material. Means are also provided for sealing each end of the lagging to the fixture. Means are also provided for creating a vacuum in a chamber formed between the side wall of the fixture and the adjacent wall of the lagging material so the lagging material expands against the side wall of the fixture. After the roller is inserted into the fixture, the vacuum is released and the lagging material releases from the side wall and collapses against the outer surface of the roller, thereby covering it. Other objects and features will be in part apparent and in part pointed out hereinafter.

BRIEF DESCRIPTION OF THE DRAWINGS

In the drawings,

FIG. 1 is a representation of one illustrative embodiment of the present invention;

Corresponding reference characters indicate corresponding parts throughout the several views of the drawings.

DESCRIPTION OF THE PREFERRED EMBODIMENT

Figure 2B:
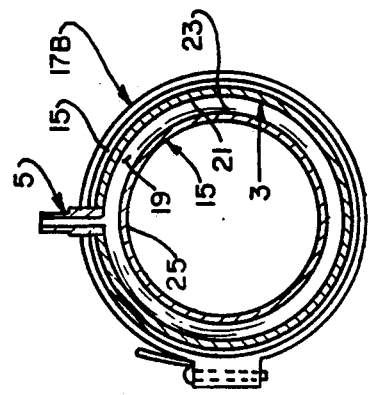
FIG. 2B is a cross sectional view taken along the line 2B—2B of FIG. 2A.

Referring now to the drawings, reference numeral 1 indicates one illustrative embodiment of the lagging attaching apparatus of our invention. The apparatus is designed for attaching a cover C to a roller R, which may be a conveyor roller or idler, for example. While the invention is discussed in particular with respect to such application, those skilled in the art will recognize the wider applicability of the invention disclosed hereinafter. Apparatus 1 includes a hollow, cylindric fixture 3 having a connection nipple 5 attached to it. The attachment may be made at any conventional location, and in the apparatus 1, the attachment is made intermediate the length of fixture 3. A vacuum line 9 interconnects a vacuum pump 11 with the fixture 3 at the connection 5. A control valve 13, which may be automatically or manually controlled, is interposed in line 9. Valve 13 preferably is switched between at least two positions. In a first position of valve 3, the fixture 3 is connected to the vacuum pump 11. In a second position of valve 3 the fixture 3 is vented to the atmosphere.

Figure 2A:
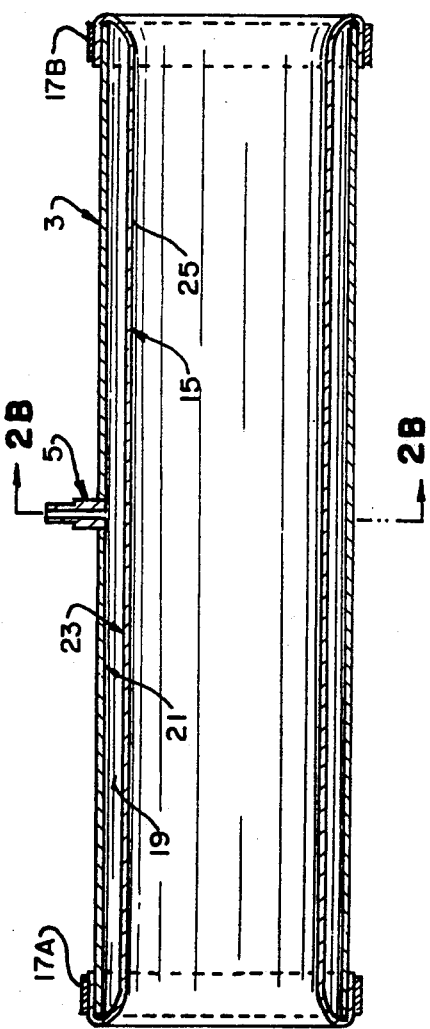
FIG. 2A is a longitudinal sectional view of a fixture, shown in FIG. 1, with a cylindrical section of cover material inserted, illustrating one method of lagging attachment.

Fixture 3 is sized to accommodate at least one diameter size of a roller R and a tube or cylindrical section 15 of cover material C. Material C is an elastometric material of any convenient construction. The material is chosen to enhance roller R operation in applicational use. Tube 15 is smaller in diameter than the diameter of roller R. Tube 15 may be cut to any desired length. It may, for example, be cut so its length exceeds the length of fixture 3. If so, then, as shown in FIG. 2A, the tube is inserted in fixture 3 so the ends of the tube extend beyond the ends of the fixture 3. The ends of the tube 15 are then folded back over the respective end of the fixture 3. Circular clamps 17A and 17, which may be pre-installed on the fixture 3 or thereon after placement of the tube, are then fitted over the exposed ends of the tube and tightened. The ends of the tube are now sealed to the fixture. With the ends so sealed, a circumferential, longitudinal chamber 19 is formed between a side wall 21 of the fixture 3 on the adjacent wall or side 23 of tube 15.

To facilitate the clamping and/or sealing operation, an expandable bladder 25 or other expandable device is used. Bladder 25 has one end 27 attached to a fitting 29. A hose 31 from an air pressure source (not shown) is connected to the fitting 29 to inflate the bladder 25. The opposite end 33 of the bladder is received in a tubular shaped tool 35. Tool 35 is of a pliable material and is designed so to be inserted into an end of the tube 15 either prior to or after insertion of the tube 15 in fixture 3. The tool 35 also is sized to secure the bladder 25 in a deflated condition of the bladder 25. The tool 35 defines a circumferential, outwardly flared skirt 37 about the open end of the fixture 3. The length of skirt 37 is chosen so that it protrudes from the end of fixture 3.

After the tool 35 and bladder 25 are inserted in an end of the tube 15 and the fixture 3, the bladder 25 is inflated As shown in FIG. 6, as the bladder continues to inflate, skirt 37 of the tool 35 enables an operator to fold the skirt 37 back over the end of the fixture 3 from the dashed line position, to the solid line position shown in FIG. 6. As this movement occurs, the end of tube 15 folds back on the end of fixture 3 and folds over the outer surface of fixture 3. One of the clamps 17A or 17B is then clamped over the end of the tube 15. It should be observed, in FIG. 6, that when bladder 25 is inflated as shown, the one end of tube 15 is pressed tightly and sealed against the inner wall of the fixture. After the end of the tube 15 is clamped, bladder 25 is evacuated and the bladder and tool 35 withdrawn. It will be understood that both ends of the tube 15 can be clamped to the respective ends of fixture 3 using the bladder and tool. That construction is shown in FIGS. 2A and 2B, for example.

Figure 3B:
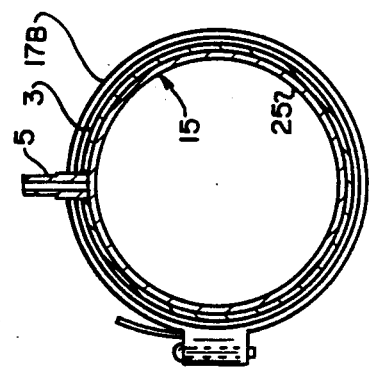
FIG. 3B is a view similar to that of FIG. 2B with a vacuum applied.
Figure 3A:
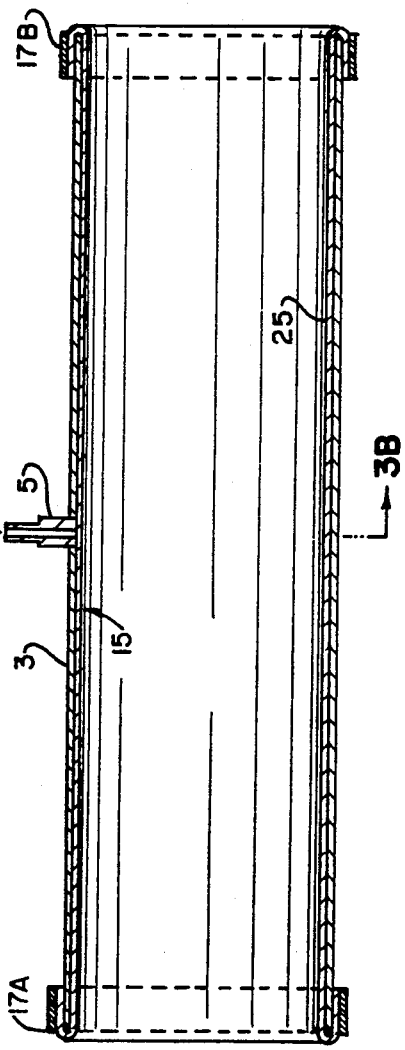
FIG. 3A is a view similar to that of FIG. 2A with a vacuum applied.

Valve 13 is now adjusted so chamber 19 is subjected to the vacuum created by pump 11. As the air within the chamber is withdrawn, atmospheric pressure acting on the tube 15 expands the tube outwardly. Since the ends of the tube 15 are clamped, wall 23 of the tube expands tightly against wall 21 of the fixture. This connection is shown in FIGS. 3A and 3B.

Figure 4B:
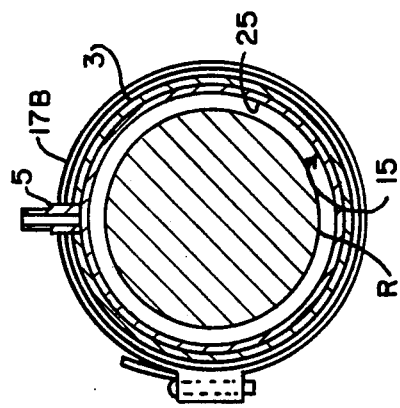
FIG. 4B is a view similar to that of FIG. 3B with a roller inserted in the fixture.
Figure 5B:
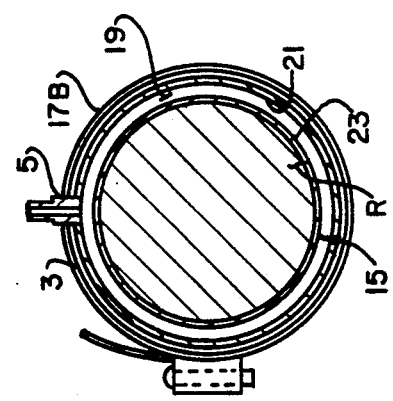
FIGS. 5A and 5B illustrate the cover material collapsed about the roller after removal of the vacuum; and, FIG. 6 illustrates an expansion bladder used to position an end of a tube for clamping to the fixture, and in the preferred embodiment, for clamping an end of the fixture.
Figure 4A:
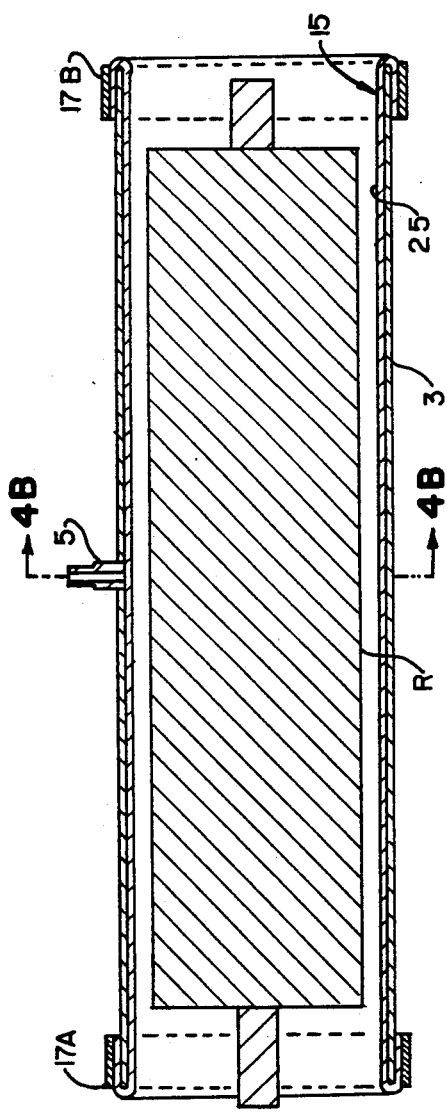
FIG. 4A is a view similar to that of FIG. 3A with a roller inserted into the fixture.
Figure 5A:
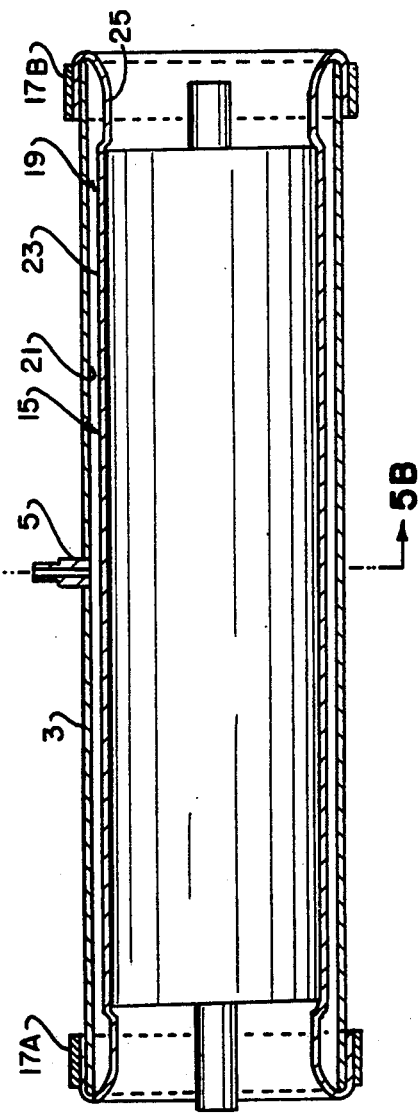

With chamber 19 evacuated, roller R is inserted into the fixture and centered therewithin as shown in FIGS. 4A and 4B. Thereafter, valve 13 is switched to vent the chamber 19 to atmospheric pressure. Since each side of the tube 15 is approaching atmospheric pressure, the tube pulls away from the side wall of the fixture 3. The tube collapses around the outer surface of roller R. Since, as previously noted, the diameter of the tube 15 is smaller than the diameter of the roller R, the tube 15 tightly engages the roller R, as shown in FIGS. 5A and 5B. To further enhance this engagement, an adhesive may be applied to the outer surface of the roller R about which the tube collapses, if desired. We have found, however, that additional adhesives are not required for many applications in which the roller R is utilized.

After the tube has attached to the roller R, clamps 17A and 17B are released and the roller/cover assembly is extracted from the fixture. The assembly is trimmed, i.e. excess tube 15 material is removed, and then the recovered roller R is ready for applicational use.

While the above description relates to the situation where both ends of tube 15 were clamped to fixture 3, it will be understood that the invention can also be practiced in the situation where only one end of the tube is clamped to the fixture. Where, for example, a roller R is substantially smaller than the length of fixture 3, it would be wasteful to cut lengths of tube 15 to a length so that the ends of the tube 15 extended beyond the end of the fixture 3 when the tube 15 was inserted into it. In such instances, most of the tube 15 material would be trimmed away after the assembly is extracted from the fixture as discussed above.

In such situations, for example, when a short roller R is to be covered, tube 15 is cut to an appropriate length which may be less than the length of fixture 3. As discussed above, one end of tube 15 is clamped to an end of the fixture 3. Rather than clamp the second end of the fixture, however, the bladder 25, in conjunction with the tool 35, is utilized to seal the second end of the tube to the fixture 3. With one end of tube 15 clamped in place, the bladder is inflated such as bladder 25 is shown in FIG. 6. As previously noted, when the bladder is inflated, it presses the end of the tube tightly against the inner wall of the fixture 3. The effect is to create a vacuum chamber 19 just as though both ends of the tube were clamped to ends of the fixture. As before, chamber 19 is evacuated, the roller inserted into position, the vacuum released, and the tube collapses about the roller to cover it. Then, the bladder is evacuated and the other end of the tube unclamped from the fixture so the assembly can be removed.

It should be obvious to those skilled in the art that many variations of the present invention as disclosed and claimed herein are possible without departing from the coverage of the invention as claimed. For example, we have found that closing one end of fixtures 3 as described above, placing the object to be covered at the other entrance to fixture 3, and drawing a vacuum as described above enables the roller R to be inserted and covered, without fixing or physically closing both ends of cover C. While rollers are described as being the objects being covered, a variety of other items can be covered using the method and apparatus of the present invention. The design of the fixture 3 may be altered in other embodiments of this invention. These variations are merely illustrative.

Having thus described the invention, what is claimed and desired to be secured by Letters Patent is:

1. Apparatus for attaching a cover material to a device to be covered, comprising:

a hollow fixture into which the device to be covered is insertable, said fixture having a first end and a second end, and at least one side wall extending between said first and said second ends;

a portion of hollow, flexible cover material insertable in the fixture, the diameter dimension of the hollow cover material being less than the corresponding diameter dimension of the device to be covered, said material having at least one side wall;

first means for sealing a first end of the flexible cover material to said hollow fixture along the first end of said fixture to permit insertion of a device to be covered into said fixture;

second means for sealing a second end of the flexible cover material to the fixture to form a chamber between the at least one side wall of a fixture and the at least one side wall of the cover material portion, one of said first and said second sealing means comprising a bladder deflatable for insertion into said cover material and expandable to seal said flexible cover material against at least a portion of the side wall of said fixture and for holding said cover in such sealing relationship; and a flexible tool, said tool being insertable in said flexible cover material, said tool being used to assist in positioning the first end of said flexible cover material along the first end of said fixture and said bladder assisting in folding of the tool and cover over the end of the fixture; and means for creating a vacuum to evacuate the chamber and expand the cover material against the at least one side wall of the fixture prior to insertion of the device to be covered into the fixture, and means for releasing the vacuum thereafter whereby the cover material falls away from the side wall and collapses around the device to be covered.

2. The device of claim 1 wherein said tool is insertable in said flexible cover material, and when so positioned, said tool defining an open end receptacle, said bladder being removably insertable into the receptacle defined by said tool and the flexible cover material for expanding the tool and the flexible cover against the side wall of said fixture and to permit the clamping of said cover material to said fixture.

3. The apparatus of claim 1 wherein the cover material has a length dimension, the length dimension thereof being less than the length dimension of said fixture.

4. A method of attaching a cover on a device to be covered comprising:
    inserting a tubular, flexible cover material into a hollow fixture said hollow fixture having a sidewall;
    inserting a flexible tool into one end of the cover material; said flexible tool defining an open end receptacle when positioned in said cover material;
    inserting an expandable member into the tool;
    expanding the expandable member, the tool and the cover material, to assist in folding of the flexible tool and flexible cover material over the end of the fixture, and clamping at least the cover material in sealing relationship to the fixture along one end thereof;
    deflating and covering the expandable member;
    inserting at least an expandable member in a second end of the cover material, expanding the member so as to seal the cover material against the fixture along a second end thereof, so that a chamber is formed between the cover material and said fixture;
    creating a vacuum to evacuate the chamber and expand the tube against the side wall of the fixture;
    inserting a device to be covered into the fixture; and
    releasing the vacuum whereby the tube falls away from the side wall and collapses around the outer surface of the device being covered.

5. The method of claim 4 wherein folding the flexible tool and flexible cover material is accomplished with manual assistance.

6. The method of claim 5 wherein a single expandable member is used in each of said inserting steps.

* * * * *